(12) United States Patent
Fukushima et al.

(10) Patent No.: US 11,403,343 B2
(45) Date of Patent: Aug. 2, 2022

(54) RETRIEVAL OF VIDEO AND VEHICLE BEHAVIOR FOR A DRIVING SCENE DESCRIBED IN SEARCH TEXT

(71) Applicant: TOYOTA JIDOSHA KABUSHIKI KAISHA, Toyota (JP)

(72) Inventors: Shintaro Fukushima, Tokyo-to (JP); Takeyuki Sasai, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 211 days.

(21) Appl. No.: 16/929,892

(22) Filed: Jul. 15, 2020

(65) Prior Publication Data
US 2021/0026887 A1  Jan. 28, 2021

(30) Foreign Application Priority Data
Jul. 26, 2019  (JP) .............................. JP2019-138287

(51) Int. Cl.
*G06F 16/783* (2019.01)
*G06F 16/732* (2019.01)
*G06V 20/40* (2022.01)

(52) U.S. Cl.
CPC ...... *G06F 16/7837* (2019.01); *G06F 16/7343* (2019.01); *G06F 16/7844* (2019.01); *G06V 20/41* (2022.01)

(58) Field of Classification Search
CPC ............. G06F 16/7837; G06F 16/7343; G06F 16/7844
See application file for complete search history.

(56) References Cited

U.S. PATENT DOCUMENTS 9,716,825 B1   7/2017 Manzari et al.
2007/0064974 A1*  3/2007 Ayachitula .......... G06F 16/7837
                                                        715/722
(Continued)

FOREIGN PATENT DOCUMENTS

JP   2019-070245 A   5/2019
JP   2019-070951 A   5/2019
(Continued)

OTHER PUBLICATIONS

Chiang, Chuan-Yen, et al. "Vehicle driving video sharing and search framework based on gps data." Genetic and Evolutionary Computing. Springer, Cham, 2014. 389-397. (Year: 2014).*

(Continued)

*Primary Examiner* — William Spieler
(74) *Attorney, Agent, or Firm* — Sughrue Mion, PLLC

(57) ABSTRACT

The retrieval device extracts a feature corresponding to search text by inputting the search text into a pre-trained text feature extraction model. The retrieval device then, for plural combinations stored in a database associating a text description including plural sentences, with a vehicle-view video, and with vehicle behavior data representing temporal vehicle behavior, computes a text distance represented by a difference between a feature extracted from each sentence of the text description associated with the video and vehicle behavior data, and the feature corresponding to the search text. The retrieval device outputs as the search result a prescribed number of pairs of video and vehicle behavior data pairs in sequence from the smallest text distance according to the text distances.

9 Claims, 8 Drawing Sheets

(56) References Cited

U.S. PATENT DOCUMENTS

| | | |
|---|---|---|
| 2015/0006443 A1 | 1/2015 | Rose et al. |
| 2015/0347534 A1 | 12/2015 | Gross et al. |
| 2015/0347985 A1 | 12/2015 | Gross et al. |
| 2016/0321559 A1 | 11/2016 | Rose et al. |
| 2017/0010769 A1 | 1/2017 | Gross et al. |
| 2017/0011354 A1 | 1/2017 | Gross et al. |
| 2017/0011355 A1 | 1/2017 | Gross et al. |
| 2017/0078767 A1* | 3/2017 | Borel .................. G11B 27/031 |
| 2017/0351974 A1 | 12/2017 | Rose et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2018/0146132 A1 | 5/2018 | Manzari et al. |
| 2018/0373980 A1* | 12/2018 | Huval .................. G06K 9/6254 |
| 2019/0082097 A1 | 3/2019 | Manzari et al. |
| 2019/0108539 A1 | 4/2019 | Watanabe et al. |
| 2019/0116371 A1 | 4/2019 | Edpalm et al. |
| 2019/0122664 A1 | 4/2019 | Oikawa et al. |
| 2019/0126757 A1 | 5/2019 | Kagawa et al. |
| 2019/0138023 A1 | 5/2019 | Niwa et al. |
| 2019/0147863 A1 | 5/2019 | Lu et al. |
| 2019/0161060 A1 | 5/2019 | Yanagida et al. |
| 2019/0161088 A1 | 5/2019 | Goto |
| 2019/0164127 A1 | 5/2019 | Kataoka et al. |
| 2019/0164431 A1 | 5/2019 | Kataoka |
| 2019/0168744 A1 | 6/2019 | Ienaga et al. |
| 2019/0172283 A1 | 6/2019 | Endo et al. |
| 2019/0176754 A1 | 6/2019 | Kaneichi et al. |
| 2019/0178661 A1 | 6/2019 | Sakaida et al. |
| 2019/0180402 A1 | 6/2019 | Nakajima et al. |
| 2019/0180619 A1 | 6/2019 | Suzuki |
| 2019/0182457 A1 | 6/2019 | Kanaoka et al. |
| 2019/0188599 A1 | 6/2019 | Yamaguchi et al. |
| 2020/0186758 A1 | 6/2020 | Kanaoka et al. |

FOREIGN PATENT DOCUMENTS

| | | |
|---|---|---|
| JP | 2019-071072 A | 5/2019 |
| JP | 2019-075037 A | 5/2019 |
| JP | 2019-075783 A | 5/2019 |
| JP | 2019-075810 A | 5/2019 |
| JP | 2019-079203 A | 5/2019 |
| JP | 2019-079345 A | 5/2019 |
| JP | 2019-079470 A | 5/2019 |
| JP | 2019-087247 A | 6/2019 |
| JP | 2019-087884 A | 6/2019 |
| JP | 2019-088040 A | 6/2019 |
| JP | 2019-089476 A | 6/2019 |
| JP | 2019-090834 A | 6/2019 |
| JP | 2019-091014 A | 6/2019 |
| JP | 2019-092077 A | 6/2019 |
| JP | 2019-095213 A | 6/2019 |
| JP | 2019-095215 A | 6/2019 |
| JP | 2019-095260 A | 6/2019 |
| JP | 2019-095795 A | 6/2019 |
| JP | 2019-095875 A | 6/2019 |
| JP | 2019-095878 A | 6/2019 |
| JP | 2019-096081 A | 6/2019 |
| JP | 2019-096124 A | 6/2019 |
| JP | 2019-096191 A | 6/2019 |
| JP | 2019-096268 A | 6/2019 |
| JP | 2019-096334 A | 6/2019 |
| JP | 2019-098779 A | 6/2019 |
| JP | 2019-098780 A | 6/2019 |
| JP | 2019-101463 A | 6/2019 |
| JP | 2019-101464 A | 6/2019 |
| JP | 2019-101554 A | 6/2019 |
| JP | 2019-101901 A | 6/2019 |
| JP | 2019-101903 A | 6/2019 |
| JP | 2019-103235 A | 6/2019 |
| JP | 2019-105517 A | 6/2019 |
| JP | 2019-105573 A | 6/2019 |
| JP | 2019-105684 A | 6/2019 |
| JP | 2019-105886 A | 6/2019 |
| JP | 2019-105994 A | 6/2019 |
| JP | 2019-106026 A | 6/2019 |
| JP | 2019-106029 A | 6/2019 |
| JP | 2019-106040 A | 6/2019 |
| JP | 2019-106041 A | 6/2019 |
| JP | 2019-106057 A | 6/2019 |
| JP | 2019-106058 A | 6/2019 |
| JP | 2019-106059 A | 6/2019 |
| JP | 2019-106098 A | 6/2019 |
| JP | 2019-106126 A | 6/2019 |
| JP | 2019-106164 A | 6/2019 |
| JP | 2019-106166 A | 6/2019 |

OTHER PUBLICATIONS

Niluthpol Chowdhury Mithun et al., "Weakly Supervised Video Moment Retrieval From Text Queries", CVPR, 2019, pp. 11592-11601, 10 pages total.

Jiyang Gao et al., "TALL: Temporal Activity Localization via Language Query", ICCV, 2017, pp. 5267-5275, 9 pages total.

Du Tran et al., "Learning Spatiotemporal Features with 3D Convolutional Networks", ICCV, pp. 4489-4497, 2015, 9 pages total.

Karen Simonyan et al., "Very Deep Convolutional Networks for Large-Scale Image Recognition", arXiv:1409.1556v1, Sep. 2014, pp. 1-10, 10 pages total.

* cited by examiner

FIG.2

| TRAINING DATA ID | TEXT DESCRIPTION | VIDEO | VEHICLE BEHAVIOR DATA |
|---|---|---|---|
| 00001 | ... | ... | ... |
| 00002 | ... | ... | ... |
| ... | ... | ... | ... |
| ... | ... | ... | ... |

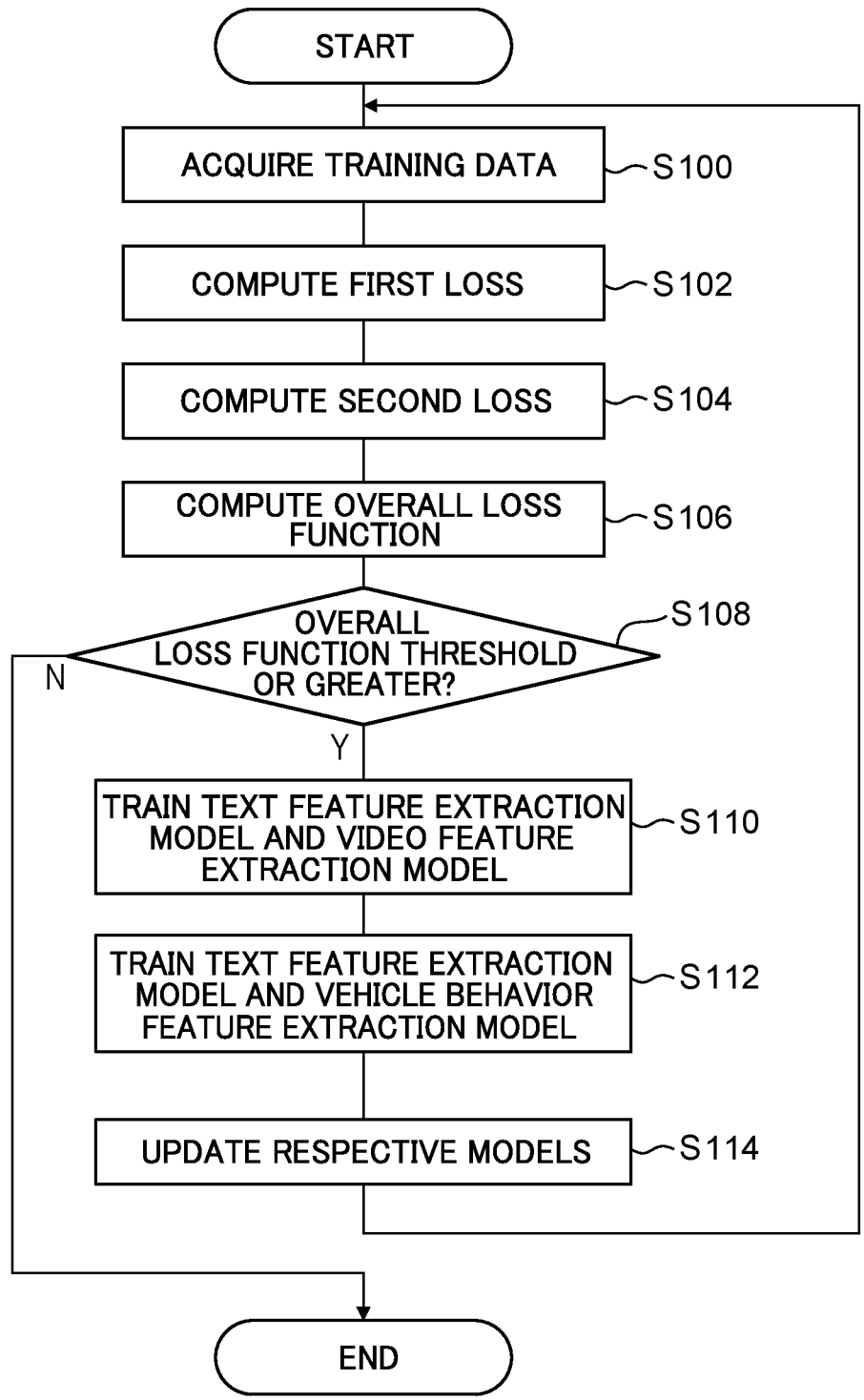

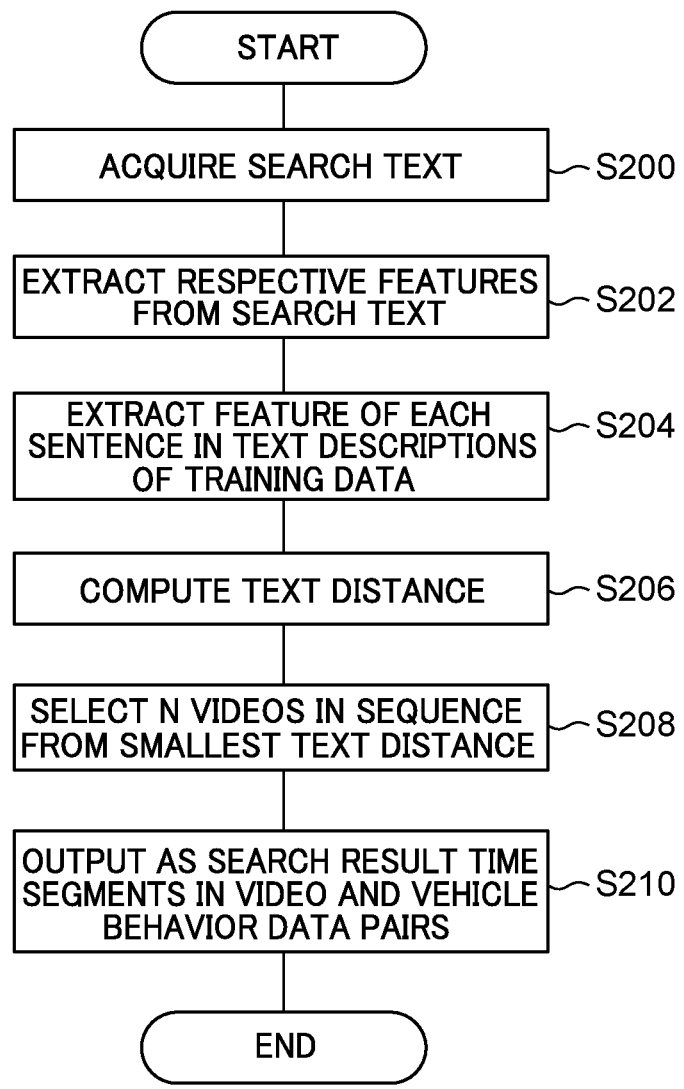

RETRIEVAL OF VIDEO AND VEHICLE BEHAVIOR FOR A DRIVING SCENE DESCRIBED IN SEARCH TEXT

CROSS-REFERENCE TO RELATED APPLICATION

This application is based on and claims priority under 35 USC 119 from Japanese Patent Application No. 2019-138287 filed on Jul. 26, 2019, the disclosure of which is incorporated by reference herein.

BACKGROUND

Technical Field

Technology disclosed herein relates to a retrieval device, a training device, a retrieval system, a retrieval program, and a training program.

Related Art

Japanese Patent Application Laid-Open (JP-A) No. 2019-95878 discloses technology to query a driver's driving behavior data and driving behavior data similar to the query is extracted and output.

Further, "Weakly Supervised Video Moment Retrieval from Text Queries" (N. C. Mithun et al., CVPR2019) and "TALL: Temporal Activity Localization via Language Query" (J. Gao et al., ICCV2017) disclose technology using a search text query to retrieve video similar to the query.

When there is a desire to search vehicle behavior data representing temporal vehicle behavior, searching for vehicle behavior data using a search text as a query, similarly to with a general search engine, is more preferable than using vehicle behavior data as a query. Moreover, in addition to vehicle behavior data, it is also preferable to retrieve video data (for example vehicle-view video data) that corresponds to such vehicle behavior data.

However, in the technology of JP-A No. 2019-95878, it is necessary to input driving behavior data corresponding to vehicle behavior data as a query. Moreover, the results output in the technology of JP-A No. 2019-95878 are merely driving behavior data.

By contrast, the technologies of "Weakly Supervised Video Moment Retrieval from Text Queries" (N. C. Mithun et al., CVPR2019) and "TALL: Temporal Activity Localization via Language Query" (J. Gao et al., ICCV2017) retrieve video using search text as a query. However, the technologies of "Weakly Supervised Video Moment Retrieval from Text Queries" (N. C. Mithun et al., CVPR2019) (hereafter referred to as Non-Patent Document 1) and "TALL: Temporal Activity Localization via Language Query" (J. Gao et al., ICCV2017) (hereafter referred to as Non-Patent Document 2) are not capable of retrieving vehicle behavior data.

Thus employing the related technologies does not enable the retrieval of video and vehicle behavior data pairs corresponding to a driving scene described in search text.

SUMMARY

A retrieval device according to a first aspect includes a memory, and a processor coupled to the memory, the processor being configured to: acquire a search text, extract a feature corresponding to the search text by inputting the search text to a text feature extraction model configured to extract features from input sentences, the text feature extraction model being pre-trained so as to reduce a loss represented by a difference between a feature extracted from a sentence and a feature extracted from a correctly matched vehicle-view video, and also being pre-trained so as to reduce a loss represented by a difference between a feature extracted from the sentence and a feature extracted from correctly matched vehicle behavior data representing temporal vehicle behavior, compute a text distance for each of a plurality of combinations stored in the memory, each combination associating a text description, including a plurality of sentences, with a vehicle-view video and with vehicle behavior data representing temporal vehicle behavior, the text distance being represented by a difference between a feature extracted from each sentence of the text description associated with the video and the vehicle behavior data, and the feature corresponding to the search text, and output, as a search result, a prescribed number of pairs of video and vehicle behavior data pairs in sequence from the smallest text distance, in accordance with all text distances.

A training device according to a first aspect includes a memory, and a processor coupled to the memory, the processor being configured, for each of a plurality of training data items associating a text description, including a plurality of sentences, with a vehicle-view video and with vehicle behavior data representing temporal vehicle behavior, to: extract a feature of a sentence of training data by inputting the sentence to a text feature extraction model configured to extract features from input sentences, extract a feature of a video corresponding to the same training data by inputting the video to a video feature extraction model configured to extract features from input video, and compute a first loss represented by a difference between the sentence feature and the video feature; extract a feature of a sentence of the training data by inputting the sentence to the text feature extraction model, extract a feature of vehicle behavior data corresponding to the same training data by inputting the vehicle behavior data to a vehicle behavior feature extraction model configured to extract features from input vehicle behavior data, and compute a second loss represented by a difference between the sentence feature and the vehicle behavior data feature; compute an overall loss function unifying the first loss with the second loss; train the text feature extraction model and the video feature extraction model so as to reduce the overall loss function; train the text feature extraction model and the vehicle behavior feature extraction model so as to reduce the overall loss function; and obtain a pre-trained sentence feature extraction model by causing the training processing to be performed repeatedly, until the overall loss function computed by the unifying section becomes smaller than a prescribed threshold.

BRIEF DESCRIPTION OF DRAWINGS

FIG. 2 is an explanatory diagram to explain an example of training data of the exemplary embodiment.

FIG. 7 is a diagram illustrating an example of training processing executed by a training device according to the exemplary embodiment.

FIG. 8 is a diagram illustrating an example of retrieval processing executed by a retrieval device according to the exemplary embodiment.

DETAILED DESCRIPTION

Exemplary Embodiment

Explanation follows regarding a retrieval system of an exemplary embodiment, with reference to the drawings.

Figure 1:
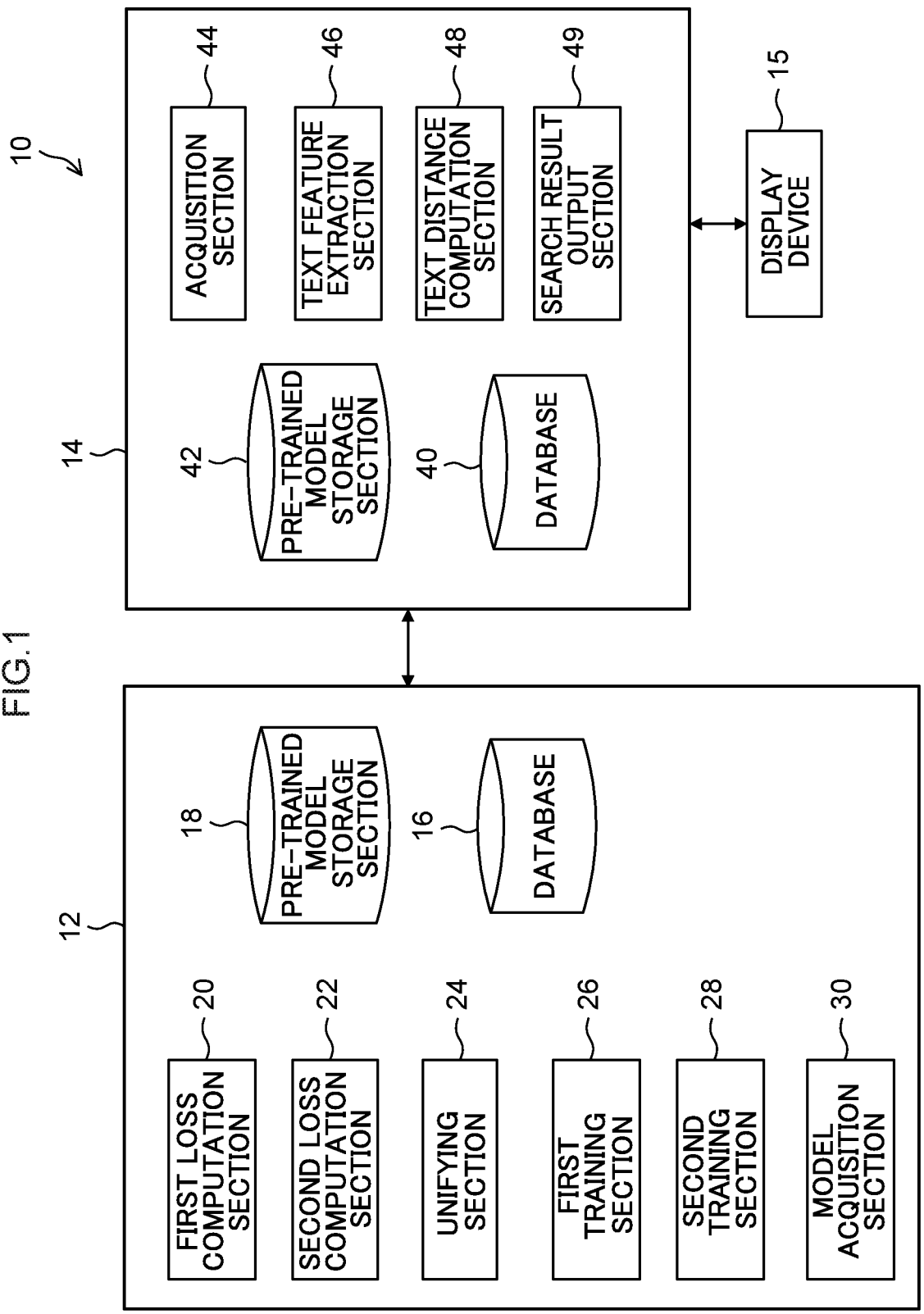
FIG. 1 is a schematic block diagram of a retrieval system according to an exemplary embodiment.

FIG. 1 is a block diagram illustrating an example of a configuration of a retrieval system 10 according to the present exemplary embodiment. As illustrated in FIG. 1, the retrieval system 10 includes a training device 12, a retrieval device 14, and a display device 15. The training device 12 and the retrieval device 14 are connected together by a prescribed method of communication.

Training Device 12

The training device 12 includes a database 16, a pre-trained model storage section 18, a first loss computation section 20, a second loss computation section 22, a unifying section 24, a first training section 26, a second training section 28, and a model acquisition section 30. The first loss computation section 20 and the second loss computation section 22 are examples of computation sections of technology disclosed herein.

The database 16 is stored with plural items of training data in which text description including plural sentences, vehicle-view video, and vehicle behavior data representing temporal vehicle behavior, are stored in association with each other. Note that the vehicle behavior data may also be referred to as driving operation data representing temporal vehicle driving operation.

For example as illustrated in FIG. 2, the database 16 is stored with text descriptions, videos, and vehicle behavior data stored in association with each other. The videos are videos captured by a vehicle-mounted camera. The vehicle behavior data is vehicle behavior data obtained when such videos were being captured. The videos and the vehicle behavior data are thus data acquired at the same time instants as each other. The text description is writing to describe the video and the vehicle behavior data, and includes plural sentences. The respective sentences in the text descriptions describe the driving scene of the video and vehicle behavior data.

In the present exemplary embodiment, text descriptions associated with the videos and vehicle behavior data are used to generate respective models to retrieve video and vehicle behavior data from search text.

The pre-trained model storage section 18 is stored with a text feature extraction model 31, a video feature extraction model 32, a first mapping model 33, a vehicle behavior feature extraction model 34, and a second mapping model 35.

The text feature extraction model 31 extracts features from input sentences. The video feature extraction model 32 extracts features from input video. The vehicle behavior feature extraction model 34 extracts features from vehicle behavior data. The first mapping model 33 and the second mapping model 35 will be described later.

Figure 3:
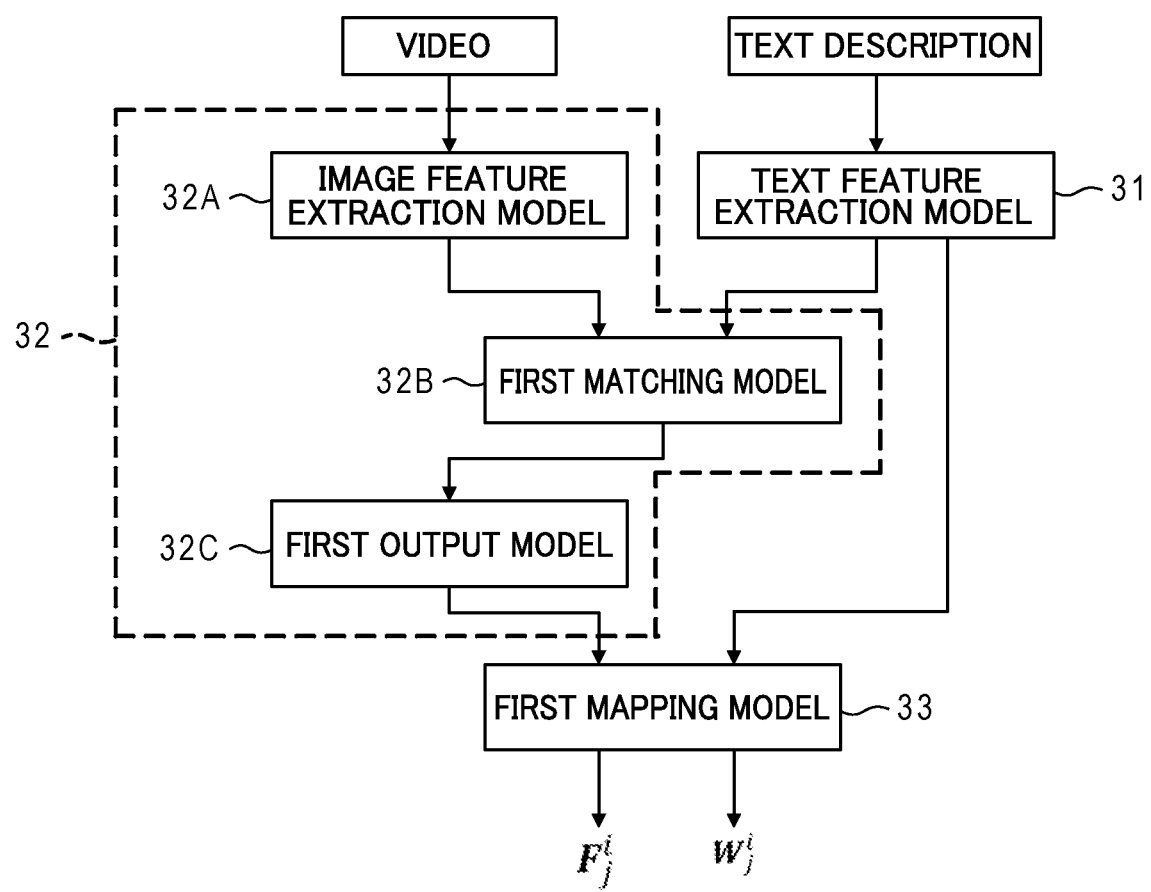
FIG. 3 is an explanatory diagram to explain models of the exemplary embodiment.
Figure 4:
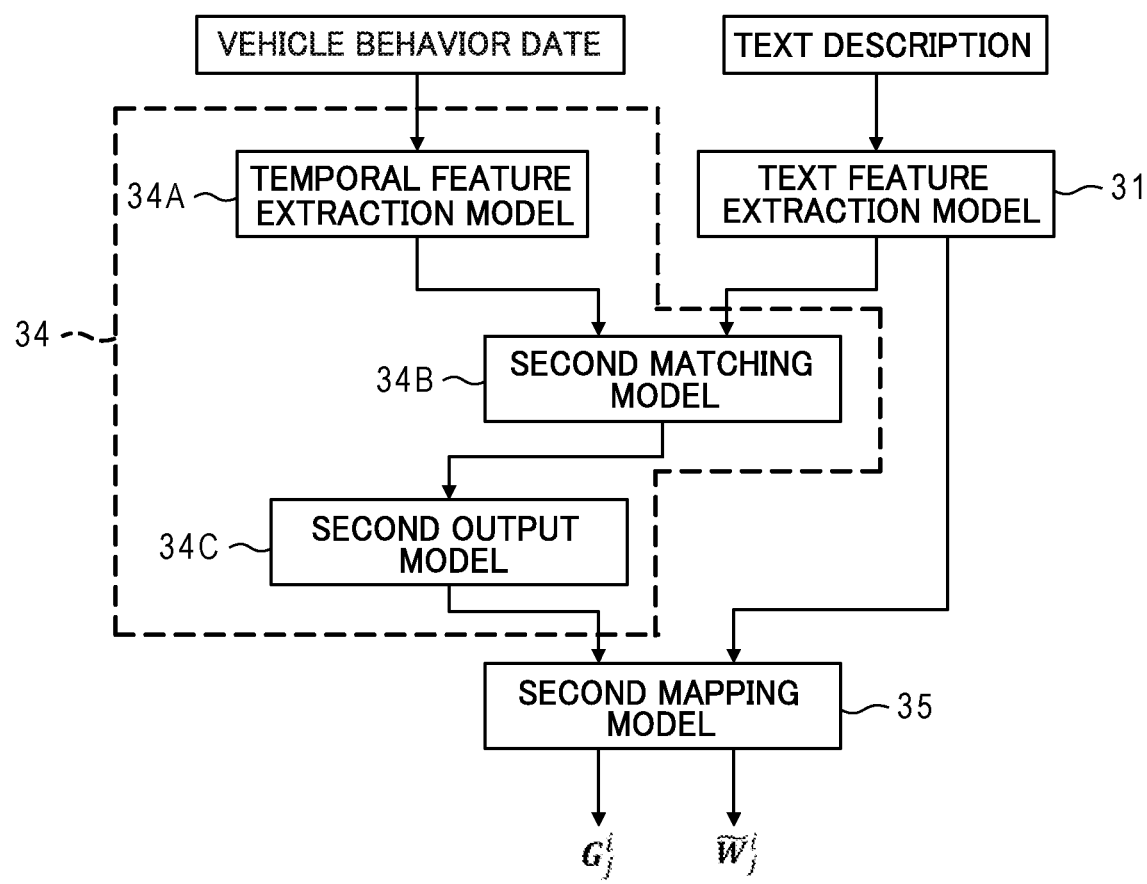
FIG. 4 is an explanatory diagram to explain models of the exemplary embodiment.

As illustrated in FIG. 3, the video feature extraction model 32 is configured including an image feature extraction model 32A, a first matching model 32B, and a first output model 32C. As illustrated in FIG. 4, the vehicle behavior feature extraction model 34 is configured including a temporal feature extraction model 34A, a second matching model 34B, and a second output model 34C. Functionality of each of these models will be described later.

The first loss computation section 20 extracts sentence features by inputting training data sentences to the text feature extraction model 31 for each of plural items of training data stored in the database 16. The first loss computation section 20 extracts video features by inputting video corresponding to the same training data to the video feature extraction model 32. The first loss computation section 20 also computes a first loss represented by a difference between the sentence features and the video features.

Specifically, the first loss computation section 20 first reads each of plural items of training data stored in the database 16. In the following the processing performed on a single item of training data will be described.

Next, the first loss computation section 20 inputs each of the plural sentences in the text description of the training data item to the text feature extraction model 31 stored in the pre-trained model storage section 18, and extracts plural sentence features. Specifically, the first loss computation section 20 extracts a feature $w_j^i$ of the $j^{th}$ sentence in the text description by inputting the text feature extraction model 31 with a $j^{th}$ sentence in the text description that has been associated with an $i^{th}$ video in the training data.

Note that an auto-encoder built with a recurrent neural network (for example LSTM or GRU) is employed in the text feature extraction model 31 to extract sentence features. Note that, for example, a hidden vector of the encoder or decoder of the auto-encoder is employed as the sentence feature. In the present exemplary embodiment, a feature is extracted for each sentence of the text description, and the resulting feature obtained for the $j^{th}$ sentence for the $i^{th}$ video is denoted by $w_j^i$.

Next, the first loss computation section 20 extracts a video feature by inputting the video feature extraction model 32 stored in the pre-trained model storage section 18 with the video corresponding to the same training data as the training data item that was employed in the text feature extraction model 31.

The video feature is extracted using the image feature extraction model 32A, the first matching model 32B, and the first output model 32C, as illustrated in FIG. 3. Specific explanation follows regarding how the video feature is extracted.

First, the first loss computation section 20 extracts individual features $v_k^i$ for frame images at time instants k in the $i^{th}$ video by inputting the image feature extraction model 32A with the frame images at time instants k in the $i^{th}$ video of the training data.

The image feature extraction model 32A is configured by a convolutional neural network, a recurrent neural network, or the like. Note that the feature of the frame image at time instant k in the $i^{th}$ video in the training data is denoted by $v_k^i$.

Note that the output from an intermediate layer of the pre-trained model may be employed to extract features from frame images, as in "C3D" of Reference Document 1 below or as in "VGG16" of Reference Document 2 below.

Reference Document 1: "Learning Spatiotemporal Features with 3D Convolutional Networks" (D. Tran et al., ICCV pages 4489 to 4497, 2015)

Reference Document 2: "Very Deep Convolutional Networks for Large-Scale Image Recognition" (K. Simonyan and A. Zisserman, arXiv: 1409.1556, 2014)

Next, the first loss computation section 20 inputs the first matching model 32B with combinations of the features $v_k^i$ of the frame images at time instants k in the $i^{th}$ video as extracted by the image feature extraction model 32A, combined with the features $w_j^i$ of the $j^{th}$ sentences of the text description for the $i^{th}$ video as extracted by the text feature extraction model 31. The first matching model 32B calculates similarities $s_{jk}^i$ between the frame images at time instants k in the $i^{th}$ video and the $j^{th}$ sentences of the text description. The first matching model 32B also calculates matching results as weighting coefficients $a_{jk}^i$ in accordance with the similarities $s_{jk}^i$.

The first matching model 32B matches frame images in the video against the text description to quantify the degree of matching therebetween. The features $v_k^i$ of the frame images in the video and the features $w_j^i$ of each sentence of the text description are employed for such matching.

Note that to perform matching, the features $v_k^i$ of the frame images and the features $w_j^i$ of each sentence of the text description need to have the same dimensionality. Accordingly, in cases in which the dimensionality of the feature $v_k^i$ of the frame images differs from the dimensionality of the feature $w_j^i$ of each sentence of the text description, processing is, for example, performed to align the dimensionality of the feature $v_k^i$ of the frame images with the dimensionality of the feature $w_j^i$ of each sentence of the text description. For example as required, additional architecture taking input of the feature $v_k^i$ of the frame images is added to the first matching model 32B so as to obtain a frame image feature $v^-{}_k^i$ of the same dimensionality as the feature $w_j^i$ of each sentence of the text description. The additional architecture may be a single-level or multi-level configuration including a fully-connected layer, a convolution layer, a pooling layer, an activation function, dropout, or the like. Note that for example, the matching processing of the first matching model 32B performs quantification by employing cosine similarity between the features $v^-{}_k^i$ of the frame images and the feature $w_j^i$ of each sentence of the text description (see, for example, Non-Patent Document 1).

The first matching model 32B also uses the similarities $s_{jk}^i$ to compute weighting coefficients $a_{jk}^i$ for the similarities between the frame images at time instants k in the $i^{th}$ video and the $j^{th}$ sentences of the text description. For example, a method in which the softmax of the similarities $s_{jk}$ may be employed therefor (see, for example, Non-Patent Document 1).

Next, the first loss computation section 20 acquires features $f_j^i$ of the $i^{th}$ video by inputting the first output model 32C with a combination of the weighting coefficients $a_{jk}^i$ that are the matching result for the $i^{th}$ video of the training data output from the first matching model 32B, combined with the features vi of the frame images at time instants k in the $i^{th}$ video as extracted by the image feature extraction model 32A.

The feature $f_j^i$ of the $i^{th}$ video corresponding to the $j^{th}$ sentence in the text description is computed by the first output model 32C by employing the features $v_k^i$ of the frame images and the weighting coefficient $a_{jk}^i$. For example, as in Equation (1) below, the feature $f_j^i$ of the $i^{th}$ video is computed using a linear coupling in which the features $v_k^i$ of the frame images are weighted using the weighting coefficient $a_{jk}^i$ (see, for example, Non-Patent Document 1).

$$f_j^i = \Sigma_k a_{jk}^i v_k^i \qquad \text{Equation (1)}$$

Next, the first loss computation section 20 inputs the first mapping model with a combination of the feature $f_j^i$ of the $i^{th}$ video of the training data as output from the first output model 32C, combined with the feature $w_j^i$ of the $j^{th}$ sentence in the text description for the $i^{th}$ video as output from the text feature extraction model 31, so as to acquire revamped video feature $F_j^i$ corresponding to the video feature $f_j^i$, and revamped sentence feature $W_j^i$ corresponding to the sentence feature $w_j^i$.

The first mapping model is a model to map plural different features into the same joint space. The video features $f_j^i$ and the sentence features $w_j^i$ are embedded in space of the same dimensionality as each other by the first mapping model so as to obtain revamped features $F_j^i$ for the video features $f_j^i$ and revamped features $W_j^i$ for the sentence features $w_j^i$. Examples of embedding methods that may be employed include linear mapping (see, for example, Non-Patent Document 1), or employing any two freely selected functions to give one mapping the same dimensionality as the other mapping.

The revamped feature $F_j^i$ of the $i^{th}$ video of the training data and the revamped feature $W_j^i$ of the $j^{th}$ sentence in the text description describing the $i^{th}$ video are thereby obtained.

Next, the first loss computation section 20 computes a first loss represented by a difference between the revamped video feature $F_j^i$ and the revamped sentence feature $W_j^i$.

A loss function $L_{VT}$ employed as the first loss may, for example, employ video-text loss (see, for example, Non-Patent Document 1). However, the loss function $L_{VT}$ is not limited thereto, and the loss function $L_{VT}$ may employ any freely selected function expressed by loss function $L_{VT} = \Sigma_{(i,j)} l_{VT}(i,j)$ representing the sum of losses $l_{VT}(i, j)$ between the $i^{th}$ video and the $j^{th}$ sentence in the text description.

The second loss computation section 22 extracts sentence features for each of the plural training data items stored in the database 16 by inputting the training data sentences to the text feature extraction model 31, and extracts vehicle behavior data features by inputting vehicle behavior data corresponding to the same training data to the vehicle behavior feature extraction model 34. The second loss computation section 22 then computes a second loss represented by a difference between the sentence features and the vehicle behavior data features.

Specifically, first the second loss computation section 22 reads each of the plural training data items stored in the database 16. The following explanation describes processing performed on a single item of training data.

First, the second loss computation section 22 extracts a vehicle behavior data feature by inputting the vehicle behavior feature extraction model 34 stored in the pre-trained model storage section 18 with the training data that was already employed in the text feature extraction model 31, and with vehicle behavior data corresponding to the same training data.

The vehicle behavior data feature is extracted using the temporal feature extraction model 34A, the second matching model 34B, and the second output model 34C illustrated in FIG. 4. Specific explanation follows regarding extraction of the vehicle behavior data features.

First, the second loss computation section 22 extracts a vehicle behavior feature $c_l^i$ at time instant l for the $i^{th}$ vehicle behavior data by inputting the temporal feature extraction model 34A with behavior at time instant l in the vehicle behavior data associated with the $i^{th}$ video in the training data.

It is assumed here that the start time and end time have been specified in advance for the vehicle behavior data associated with the $i^{th}$ video of the training data. Typically, features are extracted so as to include the period from the start time to the end time of the video; however, there is no limitation thereto.

Specifically, first the second loss computation section 22 divides the vehicle behavior data into windows [1, 1+W] for time instants l based on a window width W specified in advance by a user. Next, the second loss computation section 22 employs an auto-encoder built using a recurrent neural network (for example LSTM or GRU) to extract features from the vehicle behavior corresponding to each window. For example, an embedded vector or hidden vector of the encoder or decoder of the auto-encoder may be employed as the features. The vehicle behaviors feature $c_l^i$ at time instants l are thereby extracted from the $i^{th}$ vehicle behavior data.

Next, the second loss computation section 22 inputs the second matching model 34B with a combination of the vehicle behavior feature $c_l^i$ at time instant l in the vehicle behavior data as output from the temporal feature extraction model 34A, combined with the sentence feature $w_j^i$ extracted using the text feature extraction model 31. The second loss computation section 22 thereby calculates a similarity $u_{jl}^i$ between the vehicle behavior at time instant l in the vehicle behavior data associated with the $i^{th}$ video, and the $j^{th}$ sentence. The second loss computation section 22 also calculates as a matching result a weighting coefficient $b_{jl}^i$ in accordance with the similarity $u_{jl}^i$.

The second matching model 34B matches vehicle behavior data against text descriptions to quantify a degree of matching. The vehicle behavior feature $c_l^i$ at time instant l in the vehicle behavior data and the feature $w_j^i$ of each sentence of the text description as extracted by the first loss computation section 20 are employed in such matching.

Note that when matching, the dimensionalities of the vehicle behavior features $c_l^i$ and the feature $w_j^i$ of each sentence of the text description need to be the same. Accordingly, when the dimensionality of the vehicle behavior features $c_l^i$ and the feature $w_j^i$ of each sentence of the text description differ from each other, processing is, for example, performed to align the dimensionality of the vehicle behavior features $c_l^i$ with the dimensionality of the feature $w_j^i$ of each sentence of the text description. For example as required, additional architecture taking input of the vehicle behavior features $c_l^i$ is added to the second matching model 34B so as to obtain vehicle behavior features $c^{\sim i}_l$ of the same dimensionality as the feature $w_j^i$ of each sentence of the text description. The additional architecture may be configured by a single-level or multi-level configuration including a fully-connected layer, a convolution layer, a pooling layer, an activation function, dropout, or the like. Note that for example, the matching processing by the second matching model 34B performs quantification by employing cosine similarity between the vehicle behavior features $c^{\sim i}_l$ and the feature $w_j^i$ of each sentence of the text description (see, for example, Non-Patent Document 1).

In the following explanation, the similarity between the $j^{th}$ sentence in the text description associated with the $i^{th}$ video and the vehicle behavior in the window [1, 1+W] of the vehicle behavior data is denoted by $u_{jl}^i$.

The second matching model 34B computes, from the similarity $u_{jl}^i$, the weighting coefficient $b_{jl}^i$ of the similarity between the vehicle behavior at time instant l in the $i^{th}$ video and the $j^{th}$ sentence in the text description. For example, a method to calculate the softmax of the similarity $u_{jl}^i$ is employed (see, for example, Non-Patent Document 1).

Next, the second loss computation section 22 acquires a vehicle behavior data feature $g_j^i$ by inputting the second output model 34C with a combination of the weighting coefficient $b_{jl}^i$ output from the second matching model 34B combined with the vehicle behavior feature $c_l^i$ at time instant l in the vehicle behavior data associated with the $i^{th}$ video as extracted by the temporal feature extraction model 34A.

The second output model 34C employs the vehicle behavior feature $c_l^i$ and the weighting coefficient $b_{jl}^i$ to compute the vehicle behavior data feature $g_j^i$ for the $i^{th}$ video and the $j^{th}$ sentence in the text description. For example, as in Equation (2) below, the vehicle behavior data feature $g_j^i$ for the $j^{th}$ sentence is computed using a linear coupling of the vehicle behavior features $c_l^i$ weighted using the weighting coefficient $b_{jl}^i$ (see, for example, Non-Patent Document 1).

$$g_j^i = \sum_\ell b_{j\ell}^i c_\ell^i \qquad \text{Equation (2)}$$

Next, the second loss computation section 22 acquires a revamped vehicle behavior data feature $G_j^i$ corresponding to the vehicle behavior data feature $g_j^i$ and a revamped sentence feature $W^{\sim i}_j$ corresponding to the sentence feature $w_j^i$ by inputting the second mapping model 35 with a combination of the vehicle behavior data feature $g_j^i$ as output from the second output model 34C, combined with the feature $w_j^i$ of the $j^{th}$ sentence corresponding to the $i^{th}$ video as extracted by the text feature extraction model 31.

The second mapping model 35 is a model to map plural different features into the same joint space. The vehicle behavior data feature $g_j^i$ and the sentence feature $w_j^i$ are embedded into space of the same dimensionality by the second mapping model 35, and the revamped feature $G_j^i$ for the vehicle behavior data feature $g_j^i$ and the revamped feature $W^{\sim i}_j$ for the sentence feature $w_j^i$ are obtained thereby. Examples of the embedding method employed include linear mapping (see, for example, Non-Patent Document 1), or employing any two freely selected functions to give one mapping the same dimensionality as the other mapping. Note that the embedding dimension employed here may be the same as the dimension of embedding by the first loss computation section 20, or may be different thereto.

The revamped feature $G_j^i$ of the $i^{th}$ vehicle behavior data in the training data and the revamped feature $W^{\sim i}_j$ of the $j^{th}$ sentence in the text description describing the vehicle behavior data associated with the $i^{th}$ video are obtained thereby.

Next, the second loss computation section 22 computes a second loss represented by a difference between the revamped vehicle behavior data feature $G_j^i$ and the revamped sentence feature $W^{\sim i}_j$. The revamped features are features embedded into the joint space.

A loss function $L_{CT}$ employed as the second loss may, for example, employ video-text loss (see, for example, Non-Patent Document 1). However, the loss function $L_{CT}$ is not limited thereto, and the loss function $L_{CT}$ may employ any freely selected function expressed by loss function $L_{CT} = \Sigma_{(i,j)} l_{CT(i,j)}$ representing the sum of losses $l_{CT}(i, j)$ between the vehicle behavior data and the $j^{th}$ sentence in the text description associated with the $i^{th}$ video.

The unifying section 24 computes an overall loss function unifying a first loss $L_{VT}$ computed by the first loss computation section 20 and a second loss $L_{CT}$ computed by the second loss computation section 22.

For example, as expressed by Equation (3) below, the unifying section 24 computes an overall loss function L by performing linear coupling of the first loss $L_{VT}$ computed in training across the videos and the text descriptions, with the second loss $L_{CT}$ computed in training across the vehicle behavior data and the text descriptions. Note that λ in the following Equation is a user-specified hyperparameter.

$$\mathcal{L} = \mathcal{L}_{VT} + \lambda \mathcal{L}_{CT}, \lambda \in \mathbb{R}, \qquad \text{Equation (3)}$$

The first training section 26 trains the text feature extraction model 31, the video feature extraction model 32, and the first mapping model 33 so as to reduce the overall loss function L computed by the unifying section 24. Specifically, the first training section 26 updates the respective parameters in the text feature extraction model 31, the video feature extraction model 32, and the first mapping model 33 so as to reduce the overall loss function L. Each of the models, including the text feature extraction model 31, is thereby trained so as to reduce the loss represented by a difference between the features extracted from the sentences by the text feature extraction model 31 and the features extracted from videos correctly matched to the sentences.

The first training section 26 then updates the text feature extraction model 31 and each of the models included in the video feature extraction model 32 stored in the pre-trained model storage section 18.

The second training section 28 trains the text feature extraction model 31, the vehicle behavior feature extraction model 34, and the second mapping model 35 so as to reduce the overall loss function L computed by the unifying section 24. Specifically, the second training section 28 updates the respective parameters of the text feature extraction model 31, the vehicle behavior feature extraction model 34, and the second mapping model 35 so as to reduce the overall loss function L. Each of the models, including the text feature extraction model 31, is thereby trained so as to reduce the loss represented by a difference between the features extracted from the sentences by the text feature extraction model 31 and features extracted from vehicle behavior data correctly matched to the sentences.

The second training section 28 then updates the text feature extraction model 31 and each of the models included in the vehicle behavior feature extraction model 34 stored in the pre-trained model storage section 18.

For example, the first training section 26 and the second training section 28 update the respective parameters using a mini-batch method. A stochastic optimization method such as a stochastic gradient descent (SGD), Adam, AdaGrad, or RMSprop may be employed to update the respective model parameter.

The model acquisition section 30 causes the training processing of the first training section 26 and the training processing of the second training section 28 to be repeated until the overall loss function L computed by the unifying section 24 becomes smaller than a prescribed threshold.

The model acquisition section 30 acquires each pre-trained model when the overall loss function L has become smaller than the prescribed threshold E. The model acquisition section 30 then stores each pre-trained model in the pre-trained model storage section 18 and updates the respective models.

Note that the text feature extraction model 31 trained by both the first training section 26 and the second training section 28 is trained so as to reduce the loss represented by a difference between the features extracted from the sentences and the features extracted from videos correctly matched to the sentences. Moreover, the text feature extraction model 31 trained by both the first training section 26 and the second training section 28 is also trained so as to reduce the loss represented by a difference between the features extracted from the sentences and the features extracted from the vehicle behavior data correctly matched to the sentences.

Accordingly, in the retrieval device 14, described below, video and vehicle behavior data appropriately described by search text is retrieved from search text by employing a text feature extraction model to retrieve the video and vehicle behavior data.

Retrieval Device 14

The retrieval device 14 includes a database 40, a pre-trained model storage section 42, an acquisition section 44, a text feature extraction section 46, a text distance computation section 48, and a search result output section 49.

The database 40 is stored with the same data as the database 16 of the training device 12.

The pre-trained model storage section 42 is stored with the same models as each of the models stored in the pre-trained model storage section 18 of the training device 12.

The acquisition section 44 acquires search texts q input by a user. The search texts q are sentences used to retrieve vehicle-view video and vehicle behavior data associated with that video.

The text feature extraction section 46 inputs the search text q acquired by the acquisition section 44 to the text feature extraction model 31 stored in the pre-trained model storage section 42. The text feature extraction section 46 also extracts features output from the text feature extraction model 31 corresponding to the search text q.

In the present exemplary embodiment, the search text q is expressed as $q=(q_1, q_2)$, wherein $q_1$ is a sentence corresponding to a video, and $q_2$ a sentence corresponding to vehicle behavior data.

Specifically, first the text feature extraction section 46 identifies in the search text q a first sentence $q_1$, this being a sentence representing a video, and a second sentence $q_2$, this being a sentence representing vehicle behavior data. In the present exemplary embodiment, an example will be described in which there are two sentences included in the search text q, the first sentence thereof being the first sentence $q_1$, and the second sentence thereof being the second sentence $q_2$.

Next, the text feature extraction section 46 extracts a feature $Q_1$ of the first sentence $q_1$ by inputting the first sentence $q_1$ to the text feature extraction model 31. The text feature extraction section 46 also extracts a feature $Q_2$ of the second sentence $q_2$ by inputting the second sentence $q_2$ to the text feature extraction model.

Next, the text feature extraction section 46 employs the respective models stored in the pre-trained model storage section 42 to extract, for each of the plural training data items stored in the database 40, features from each sentence of the text description associated with the video and the vehicle behavior data.

Note that an embedded feature of a $j_1^{th}$ sentence of a text description for the $i^{th}$ video in the training data is denoted $W_{j1}^i$. An embedded feature of the $j_2^{th}$ sentence of a text description for the vehicle behavior data associated with the $i^{th}$ video in the training data is denoted $W_{j2}^i$.

In the present exemplary embodiment, an example will be described in which the features $W_{j1}^i$, $W_{j2}^i$ are extracted by the text feature extraction section 46 of the retrieval device 14; however features $W_{j1}^i$, $W_{j2}^i$ extracted by the training device 12 may also be employed therefor.

The text distance computation section 48 computes a text distance representing a difference between the features $W_{j1}^i$, $W_{j2}^i$ extracted by the text feature extraction section 46 from each of the sentences of the text descriptions in the plural training data items, and the features $Q_1$, $Q_2$ corresponding to the search text, as extracted by the text feature extraction section 46.

Specifically, the text distance computation section 48 uses Equation (4) below to compute the difference between the feature $Q_1$ of the first sentence $q_1$ and the feature $W_{j1}^{\,i}$ of the $j^{th}$ sentence in the text description associated with the $i^{th}$ video stored in the database 40.

$$\|Q_1 - W_{j1}^{\,i}\| \quad \text{Equation (4)}$$

The text distance computation section 48 also uses Equation (5) below to compute the difference between the feature $Q_2$ of the second sentence $q_2$ and the feature $\tilde{W}_{j2}^{\,i}$ of the $j_2^{\,th}$ sentence in the text description associated with $i^{th}$ video stored in the database 40.

$$\|Q_2 - \tilde{W}_{j2}^{\,i}\| \quad \text{Equation (5)}$$

Note that $\|\cdot\|$ denotes the norm of a vector and, for example, an L2 norm or an L1 norm may be employed therefor. $\nu > 0$ is a parameter specified in advance by a user.

The text distance computation section 48 then computes, as the text distance, the value expressed by Equation (6) below, this being a weighted sum of the differences computed using Equation (4) and the differences computed using Equation (5).

$$\|Q_1 - W_{j1}^{\,i}\| + \nu \|Q_2 - \tilde{W}_{j2}^{\,i}\| \quad \text{Equation (6)}$$

Note that the text distance is computed for each sentence of the text description for each training data item.

According to the text distances computed by the text distance computation section 48, the search result output section 49 identifies a prescribed number N of videos $i^{(n)}$ in sequence from the smallest text distance, and two sentences $j_1^{(n)}$, $j_2^{(n)}$ included in the text descriptions associated with each of these videos, according to Equation (7) below. Note that $i^{(n)}$ represents an index of videos in the training data, and $j_1^{(n)}$, $j_2^{(n)}$ represent an index of sentences included in the text descriptions.

$$\{(i^{(n)}, j_1^{(n)}, j_2^{(n)})\}_{n=1}^{N} = \arg\min_{i,j_1,j_2}{}^{(N)} \{\|Q_1 - W_{j1}^{\,i}\| + \nu \|Q_2 - \tilde{W}_{j2}^{\,i}\|\} \quad \text{Equation (7)}$$

Equation (8) below is a function to return a collection of triplets $(i, j_1, j_2)$ produced when a target function $f(i, j_1, j_2)$ is extracted N times in sequence from the smallest.

$$\arg\min_{i,j_1,j_2}{}^{(n)} f(i, j_1, j_2) \quad \text{Equation (8)}$$

Equation (7) above is used to identify the N videos $i^{(n)}$ in sequence from the smallest text distance and the sentences $j_1^{(n)}$, $j_2^{(n)}$ of the text description associated with each of these videos.

Moreover, for each of an $n^{th}$ pair (wherein $1 \leq n \leq N$) out of N pairs of video and vehicle behavior data pairs, the search result output section 49 identifies frame images for a segment $[k_s^{(n)}, k_e^{(n)}]$ for which a weighting coefficient $a_{j1(n)k}^{i}$ is larger than a threshold $\delta_1$, based on the weighting coefficient $a_{j1(n)k}^{i}$ in accordance with a similarity $s_{jk}^{i}$ between a feature of the $j_1^{(n)th}$ sentence in the text description associated with the $i^{th}$ video corresponding to the $n^{th}$ pair and a feature of a frame image at the time instant k in the $i^{th}$ video. Note that the weighting coefficients $a_{j1(n)k}^{i}$ for respective training data are calculated in advance by the training device 12, and stored in the database 40.

Specifically, the search result output section 49 takes a maximum length time segment $K^{(n)} = [k_s^{(n)}, k_e^{(n)}]$ of consecutive time instants k satisfying weighting coefficient $a_{j1(n)k}^{i} > \delta_1$ for the weighting coefficient threshold $\delta_1$, $0 < \delta_1 < 1$ specified in advance by the user, as a video time band corresponding to the $j_1^{(n)}$ sentence in the text description.

Moreover, for each of the $n^{th}$ pair ($1 \leq n \leq N$) out of the N pairs of video and vehicle behavior data pairs, the search result output section 49 identifies a vehicle behavior for a segment $[l_s^{(n)}, l_e^{(n)}]$ having a weighting coefficient $b_{j2(n)l}^{i}$ larger than a threshold $\delta_2$, based on the weighting coefficient $b_{j2(n)l}^{i}$ in accordance with a similarity $u_{j2(n)l}^{i}$ between a feature of the $j_2^{(n)th}$ sentence in the text description associated with the vehicle behavior data corresponding to the $i^{th}$ video corresponding to the $n^{th}$ pair, and a vehicle behavior feature at time instant l in the vehicle behavior data corresponding to the $i^{th}$ video. Note that the weighting coefficient $b_{j2(n)l}^{i}$ for each training data item is calculated in advance by the training device 12, and stored in the database 40.

Specifically, as a vehicle behavior data time band corresponding to the sentence $j_2^{(n)}$ in the text description, the search result output section 49 takes a time segment $L^{(n)} = [l_s^{(n)}, l_e^{(n)}]$ of consecutive time instants l satisfying weighting coefficient $b_{j2(n)l}^{i} > \delta_2$ for the weighting coefficient threshold $0 < \delta_2 < 1$ specified in advance by the user.

The search result output section 49 then outputs as a search result pairings of video time segments $[k_s^{(n)}, k_e^{(n)}]$ and the vehicle behavior data time segments $[l_s^{(n)}, l_e^{(n)}]$.

For example, the search result output section 49 employs the time segment $K^{(n)} = [k_s^{(n)}, k_e^{(n)}]$ of the video i corresponding to the search text q acquired by the acquisition section 44, and the time segment $L^{(n)} = [l_s^{(n)}, l_e^{(n)}]$ of the vehicle behavior data to display video and vehicle behavior data on the display device 15. A pair of video and vehicle behavior data corresponding to the search text q is thereby obtained.

The search result output from the search result output section 49 is output to the display device 15. For example, the display device 15 displays search results as illustrated in FIG. 5, in which pairs of the video and vehicle behavior data are ranked for display.

Figure 5:
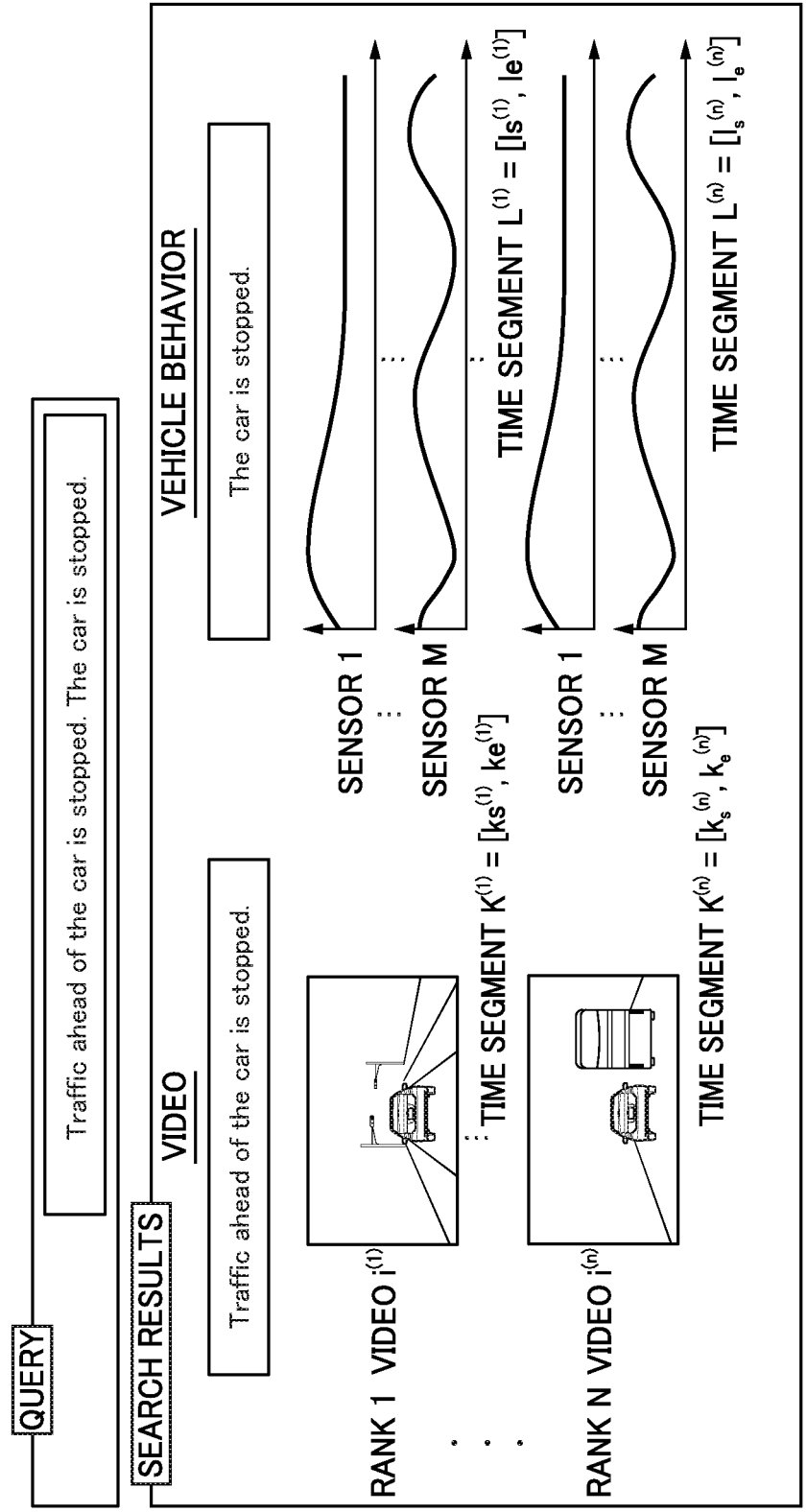
FIG. 5 is a diagram illustrating an example of search results displayed on a display device.

The example illustrated in FIG. 5 is an example in which the search text "Traffic ahead of the car is stopped. The car is stopped." has been input to the retrieval device 14 as a query. In this case, "Traffic ahead of the car is stopped." is identified as the first sentence $q_1$, and "The car is stopped." is identified as the second sentence $q_2$. Videos described by the first sentence $q_1$ and vehicle behavior data described by the second sentence $q_2$ are searched for, and N items are output as search results in sequence from the smallest loss. Note that sensor 1 . . . sensor M of the vehicle behavior data represents vehicle behavior data obtained by different sensors.

Figure 6:
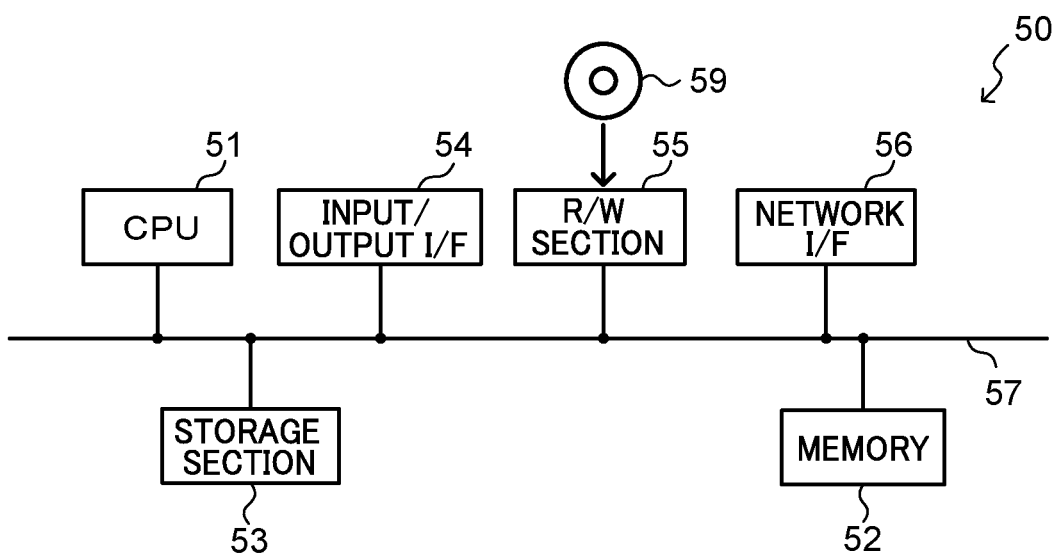
FIG. 6 is a diagram illustrating an example of a configuration of a computer to implement respective devices configuring a retrieval system.

The training device 12 and the retrieval device 14 may, for example, be implemented by a computer 50 such as that illustrated in FIG. 6. The computer 50 includes a CPU 51, memory 52 serving as a temporary storage region, and a non-volatile storage section 53. The computer 50 further includes an input/output interface (I/F) 54 for connecting input/output devices (not illustrated in the drawings) and the like to, and a read/write (R/W) section 55 to control reading and writing of data with respect to a recording medium 59. The computer 50 further includes a network I/F 56 that is connected to a network such as the internet. The CPU 51, the memory 52, the storage section 53, the input/output I/F 54, the R/W section 55, and the network I/F 56 are connected together through a bus 57.

The storage section 53 may be implemented by a hard disk drive (HDD), a solid state drive (SSD), flash memory, or the like. The storage section 53 serves as a storage medium, and is stored with a program to cause the computer 50 to function. The CPU 51 reads the program from the storage section 53, expands the program in the memory 52, and sequentially executes processes in the program.

Next, explanation follows regarding operation of the retrieval system 10 of the present exemplary embodiment.

Plural training data items are stored in the database 16 of the training device 12 stores. When the training device 12 receives a signal instructing training processing, the training device 12 executes a training processing routine as illustrated in FIG. 7.

At step S100, the first loss computation section 20 acquires the plural training data items stored in the database 16. The second loss computation section 22 also acquires the plural training data items stored in the database 16.

At step S102, the first loss computation section 20 acquires the video features $f_j^i$ for the respective training data items acquired at step S100 by inputting the videos to the video feature extraction model 32, and acquires the sentence features $w_j^i$ by inputting each of the sentences of the text descriptions to the text feature extraction model 31. The first loss computation section 20 also acquires the revamped video features $F_j^i$ and the revamped sentence features $W_j^i$ by inputting the video features $f_j^i$ and the sentence features $w_j^i$ to the first mapping model 33, and then computes the first loss $L_{VT}$ represented by the difference between the revamped video features $F_j^i$ and the revamped sentence features $W_j^i$.

At step S104, the second loss computation section 22 acquires the vehicle behavior data feature $g_j^i$ for each of the training data items acquired at step S100 by inputting the vehicle behavior data to the vehicle behavior feature extraction model 34. The second loss computation section 22 also acquires the revamped vehicle behavior data features $G_j^i$ and the revamped sentence features $W\tilde{\ }_j^i$ by inputting the vehicle behavior data features $g_j^i$ and the sentence features $w_j^i$ to the second mapping model 35, and then computes the second loss $L_{CT}$ represented by the difference between the revamped vehicle behavior data features $G_j^i$ of the and the revamped sentence features $W\tilde{\ }_j^i$.

At step S106, the unifying section 24 uses Equation (3) to compute the overall loss function L unifying the first loss $L_{VT}$ computed at step S102 with the second loss $L_{CT}$ computed at step S104.

At step S108, the model acquisition section 30 determines whether or not the overall loss function L computed at step S106 is the prescribed threshold ε or greater. Processing transitions to step S110 in cases in which the overall loss function L is the prescribed threshold E or greater. The training processing routine is ended in cases in which the overall loss function L is smaller than the prescribed threshold E.

At step S110, the first training section 26 trains the text feature extraction model 31 and the video feature extraction model 32 so as to reduce the overall loss function L computed at step S106.

At step S112, the second training section 28 trains the text feature extraction model 31 and the vehicle behavior feature extraction model 34 so as to reduce the overall loss function L computed at step S106.

At step S114, the first training section 26 updates the text feature extraction model 31 and the respective models included in the video feature extraction model 32 stored in the pre-trained model storage section 18. The second training section 28 also updates the text feature extraction model 31 and the respective models included in the vehicle behavior feature extraction model 34 stored in the pre-trained model storage section 18.

When training of each model by the training device 12 has been completed, each of these models is stored in the pre-trained model storage section 18 of the retrieval device 14. The respective values computed by the training device 12 and the plural training data items are stored in the database 40 of the retrieval device 14.

When a user inputs a search text q, the retrieval device 14 executes a retrieval processing routine, as illustrated in FIG. 8.

At step S200, the acquisition section 44 acquires the search text q input by the user.

At step S202, the text feature extraction section 46 inputs the first sentence $q_1$, this being a sentence describing the video in the search text q acquired at step S200, to the text feature extraction model 31 stored in the pre-trained model storage section 42 and extracts the feature $Q_1$ for the first sentence $q_1$. The text feature extraction section 46 also inputs the text feature extraction model 31 stored in the pre-trained model storage section 42 with the second sentence $q_2$, this being a sentence describing the vehicle behavior data in the search text q acquired at step S200, and extracts the feature $Q_2$ for the second sentence $q_2$.

At step S204, the text feature extraction section 46 uses the respective models stored in the pre-trained model storage section 42 on each of the plural training data items stored in the database 40 to extract a feature from each sentence of the text description associated with the video and the vehicle behavior data.

At step S206, the text distance computation section 48 computes for each of the plural training data items stored in the database 40 the text distance represented by the difference between the features (for example $W_{j1}^i$, $W_{j2}^i$) of each sentence of the text descriptions of the plural training data items extracted at step S204 and the features $Q_1$, $Q_2$ corresponding to the search text extracted at step S202.

At step S208, the search result output section 49 uses Equation (7) to identify N videos $i^{(n)}$ in sequence from the smallest text distance according to the text distances computed at step S206, and the two sentences $j_1^{(n)}$, $j_2^{(n)}$ in the text description associated with each of these videos.

At step S210, for each $n^{th}$ pair (1≤n≤N) out of the N pairs of video and vehicle behavior data pairs, the search result output section 49 outputs as a search result the segment $K^{(n)}=[k_s^{(n)}, k_e^{(n)}]$ in the videos selected at step S208 and the segment $L^{(n)}=[l_s^{(n)}, l_e^{(n)}]$ of the vehicle behavior data associated with these videos, and then ends the retrieval processing routine.

As described above, the retrieval device 14 according to the present exemplary embodiment extracts features corresponding to search text by inputting the search text to the text feature extraction model 31 that has pre-trained so as to reduce the loss represented by the difference between a feature extracted from a sentence and a feature extracted from a correctly matched vehicle-view video, and also so as to reduce the loss represented by the difference between a feature extracted from the sentence and a feature extracted from correctly matched vehicle behavior data representing temporal vehicle behavior. Moreover, for each of the plural combinations stored in the database of a text description including plural sentences, associated with vehicle-view video, and associated with vehicle behavior data representing temporal vehicle behavior, the retrieval device 14 computes a text distance represented by a difference between a feature extracted from each sentence of the text description that is associated with the video and the vehicle behavior data, and the feature corresponding to the search text. The retrieval device 14 also, according to the text distance, outputs as search results a prescribed number of pairs of video and vehicle behavior data pairs in sequence from the smallest text distance. This enables appropriate video and vehicle behavior data pairs to be retrieved that correspond to a driving scene described by the search text.

Moreover, for each of the plural training data items associating a text description including plural sentences, a vehicle-view video, and vehicle behavior data representing temporal vehicle behavior with each other, the training device 12 according to the present exemplary embodiment extracts sentence features by inputting the sentences of the training data to the text feature extraction model 31. The training device 12 also extracts the video features by inputting the video corresponding to the same training data to the video feature extraction model 32. The training device 12 also computes the first loss represented by the difference between the sentence feature and the video feature. The training device 12 also extracts vehicle behavior data features by inputting the vehicle behavior data corresponding to the same training data to the vehicle behavior feature extraction model 34. The training device 12 also computes the second loss represented by the difference between the sentence feature and the vehicle behavior data feature. Next, the training device 12 computes the overall loss function L unifying the first loss with the second loss. The training device 12 also trains the text feature extraction model 31 and the video feature extraction model 32 so as to reduce the overall loss function. The training device 12 also trains the text feature extraction model 31 and the vehicle behavior feature extraction model 34 so as to reduce the overall loss function. The training device 12 also obtains the pre-trained text feature extraction model 31 by causing the training processing of the first training section and the training processing of the second training section to be repeated until the overall loss function is smaller than the prescribed threshold. This enables the text feature extraction model 31 to be obtained that retrieves appropriate video and vehicle behavior data pairs corresponding to the driving scene described by the search text. Note that in performing the training method that considers the video and the vehicle behavior data in the training device 12, the text feature extraction model 31 and the vehicle behavior feature extraction model 34 both rely on sentence feature extraction. There is therefore a need to perform video and vehicle behavior data training in parallel.

Note that although a case has been described in which the processing performed by the respective devices in the exemplary embodiment described above is software processing performed by executing a program, the processing may be performed by hardware. Alternatively, processing may be performed using a combination of both software and hardware. The program stored in the ROM may be stored on various storage media for distribution.

Technology disclosed herein is not limited to the above, and obviously various other modifications may be implemented within a range not departing from the spirit thereof.

For example, any type of model may be employed as the respective models. For example, the respective models illustrated in FIG. 3 and the respective models illustrated in FIG. 4 may be configured from a single-level or multi-level configuration including fully-connected layers, convolution layers, pooling layers, activation functions, dropouts, and the like.

In the exemplary embodiment described above, explanation has been given regarding an example in which the video and the vehicle behavior data are each separately mapped into the embedded space together with the text description to find the first loss and the second loss respectively. However, there is no limitation thereto. For example, the video and the vehicle behavior data may each be mapped into the same embedded space so as to compute a loss therein.

In the exemplary embodiment described above, explanation has been given regarding an example in which output as the search result is pairs of the segments $K^{(n)}=[k_s^{(n)}, k_e^{(n)}]$ in the video paired with the segments $L^{(n)}=[l_s^{(n)}, l_e^{(n)}]$ in the vehicle behavior data associated with this video. However, there is no limitation thereto. For example, just video and vehicle behavior data pairs may be output as the search result.

Moreover, configuration may be adopted in which a number n* (n*<N) of pairs that is a number preset by a user is output as search results when outputting pairs configured by the segments $K^{(n)}=[k_s^{(n)}, k_e^{(n)}]$ of the video and the segments $L^{(n)}=[l_s^{(n)}, l_e^{(n)}]$ of the vehicle behavior data associated with this video.

In consideration of the above circumstances, an object of technology disclosed herein is to provide a retrieval device, a training device, a retrieval system, a retrieval program, and a training program capable of retrieving video and vehicle behavior data pairs corresponding to a driving scene described in search text.

Solution to Problem

A retrieval device according to a first aspect includes an acquisition section, a text feature extraction section, a computation section, and a search result output section. The acquisition section is configured to acquire a search text. The text feature extraction section is configured to extract a feature corresponding to the search text acquired by the acquisition section by inputting the search text to a text feature extraction model configured to extract features from input sentences. The text feature extraction model is pre-trained so as to reduce a loss represented by a difference between a feature extracted from a sentence and a feature extracted from a correctly matched vehicle-view video, and is also pre-trained so as to reduce a loss represented by a difference between a feature extracted from the sentence and a feature extracted from correctly matched vehicle behavior data representing temporal vehicle behavior. The computation section is configured to compute a text distance for each of plural combinations stored in a database with each combination associating a text description including plural sentences, with a vehicle-view video, and with vehicle behavior data representing temporal vehicle behavior. The text distance is represented by a difference between a feature extracted from each sentence of the text description associated with the video and vehicle behavior data, and the feature corresponding to the search text. The search result output section is configured to output as a search result a prescribed number of pairs of video and vehicle behavior data pairs in sequence from the smallest text distance according to the text distances computed by the computation section.

In the retrieval device according to the first aspect, a feature corresponding to the search text is extracted by inputting the search text to the text feature extraction model pre-trained so as to reduce a loss represented by the difference between a feature extracted from a sentence and a feature extracted from a correctly matched vehicle-view video, and pre-trained so as to reduce a loss represented by the difference between a feature extracted from the sentence and a feature extracted from correctly matched vehicle behavior data representing temporal vehicle behavior. The retrieval device then outputs as the search result the prescribed number of pairs of video and vehicle behavior data pairs in sequence from the smallest text distance according to the text distance represented by the difference between a feature extracted from each sentence of the text description associated with the video and vehicle behavior data, and the feature corresponding to the search text. This enables retrieval of video and vehicle behavior data pairs corresponding to a driving scene described by the search text.

A retrieval device of a second aspect has the following configuration. The text feature extraction section therein is configured to extract a feature $Q_1$ of a first sentence $q_1$ that is a sentence in the search text that describes a video by inputting the first sentence $q_1$ to a text feature extraction model, and extract a feature $Q_2$ of a second sentence $q_2$ that is a sentence in the search text that describes vehicle behavior data by inputting the second sentence $q_2$ to a text feature extraction model. The computation section therein is configured to compute the text distance according to a difference between the feature $Q_1$ of the first sentence $q_1$ and a feature $W_{j1}^i$ of a $j_1^{th}$ sentence of a text description associated with an $i^{th}$ video for each of plural training data items stored in a database, and also according to a difference between the feature $Q_2$ of the second sentence $q_2$ and a feature $W^\sim{}_{j2}^i$ of a $j_2^{th}$ sentence of a text description associated with the $i^{th}$ video stored in the database. The search result output section therein is configured to output as a search result N pairs of video and vehicle behavior data pairs in sequence from the smallest text distance. This enables retrieval of video and vehicle behavior data pairs that correspond to a driving scene described by the search text in consideration of the sentence describing the video and the sentence describing the vehicle behavior that are included in the search text.

In a retrieval device of a third aspect, for each $n^{th}$ ($1 \leq n \leq N$) pair included in the N pairs of video and vehicle behavior data pairs, the search result output section is configured to output as the search result a pair of frame images of a segment $[k_s^{(n)}, k_e^{(n)}]$ for which a weighting coefficient $a_{j1(n)k}^i$ is larger than a threshold $\delta_1$, based on the weighting coefficient $a_{j1(n)k}^i$ in accordance with a similarity $s_{jk}^i$ between a feature of a $j_1^{(n)th}$ sentence in the text description associated with the $i^{th}$ video corresponding to the $n^{th}$ pair and a feature of a frame image for a time instant k in the $i^{th}$ video, and a vehicle behavior of a segment $[l_s^{(n)}, l_e^{(n)}]$ for which a weighting coefficient $b_{j2(n)l}^i$ is larger than a threshold $\delta_2$, based on the weighting coefficient $b_{j2(n)l}^i$ in accordance with a similarity $u_{j2(n)l}^i$ between a feature of a $j_2^{(n)th}$ sentence in the text description associated with vehicle behavior data corresponding to the $i^{th}$ video corresponding to the $n^{th}$ pair and a feature of a vehicle behavior at a time instant l in the vehicle behavior data corresponding to the $i^{th}$ video. This thereby enables a driving scene described by the search text from out of the video and vehicle behavior data pairs to be appropriately presented.

In a retrieval device of a fourth aspect, the search result output section is configured to output as the search result a number of n* pairs out of the N pairs of video and vehicle behavior data pairs, wherein the number n* has been preset by a user. This thereby enables the number of search results desired by a user to be appropriately presented.

A training device according to a fifth aspect is a training device including a first loss computation section, a second loss computation section, a unifying section, a first training section, a second training section, and a model acquisition section. For each of plural training data items associating a text description including plural sentences, with a vehicle-view video, and with vehicle behavior data representing temporal vehicle behavior, the first loss computation section is configured to extract a feature of a sentence of training data by inputting the sentence to a text feature extraction model configured to extract features from input sentences, to extract a feature of a video corresponding to the same training data by inputting the video to a video feature extraction model configured to extract features from input video, and to compute a first loss represented by a difference between the sentence feature and the video feature. The second loss computation section is configured to extract a feature of a sentence of the training data by inputting the sentence to the text feature extraction model, to extract a feature of vehicle behavior data corresponding to the same training data by inputting the vehicle behavior data to a vehicle behavior feature extraction model configured to extract features from input vehicle behavior data, and to compute a second loss represented by a difference between the sentence feature and the vehicle behavior data feature. The unifying section is configured to compute an overall loss function unifying the first loss with the second loss. The first training section is configured to train the text feature extraction model and the video feature extraction model so as to reduce the overall loss function computed by the unifying section. The second training section is configured to train the text feature extraction model and the vehicle behavior feature extraction model so as to reduce the overall loss function computed by the unifying section. The model acquisition section is configured to obtain a pre-trained sentence feature extraction model by causing the training processing by the first training section and training processing by the second training section to be performed repeatedly until the overall loss function computed by the unifying section becomes smaller than a prescribed threshold.

In the training device according to the fifth aspect, the first loss represented by the difference between the sentence feature and the video feature is computed, the second loss represented by the difference between the sentence feature and the vehicle behavior data feature is computed, and the overall loss function unifying the first loss with the second loss is computed. The training device then trains the text feature extraction model and the video feature extraction model so as to reduce the overall loss function. The training device also trains the text feature extraction model and the vehicle behavior feature extraction model so as to reduce the overall loss function. This thereby enables the text feature extraction model to be obtained that retrieves appropriate video and vehicle behavior data pairs corresponding to a driving scene described by the search text. Specifically, generating the text feature extraction model that considers the relationships of the text description to both video and vehicle behavior data enables the text feature extraction model to be obtained that retrieves appropriate video and vehicle behavior data pairs corresponding to a driving scene described by the search text.

A training device according to a sixth aspect is configured as follows. The first loss computation section therein is configured to acquire a revamped sentence feature and a revamped video feature mapped into a same joint space by inputting the sentence feature extracted by the text feature extraction model and the video feature extracted by the video feature extraction model to a first mapping model configured to map plural different features into the same joint space, and is also configured to compute a first loss represented by a difference between the revamped sentence feature and the revamped video feature. The second loss computation section therein is configured to acquire a revamped sentence feature and a revamped vehicle behavior data feature mapped into a same joint space by inputting the sentence feature extracted by the text feature extraction model and the vehicle behavior data feature extracted by the vehicle behavior feature extraction model to a second mapping model configured to map plural different features into the same joint space, and is also configured to compute a second loss represented by a difference between the revamped sentence feature and the revamped vehicle behavior data feature. The differences between features can be computed due the sentence features and the video features being mapped into the same joint space, and the sentence features and the vehicle behavior data being mapped into the same joint space. This in turn enables the text feature extraction model to be trained appropriately.

A training device according to a seventh aspect is configured as follows. The video feature extraction model includes an image feature extraction model configured to extract features from images, a first matching model configured to match sentence features against image features, and a first output model configured to output video features based on matching results output from the first matching model and the image feature. The vehicle behavior feature extraction model includes a temporal feature extraction model configured to extract features from vehicle behavior at each time instant of the vehicle behavior data, a second matching model configured to match sentence features against vehicle behavior features, and a second output model configured to output vehicle behavior data features based on matching results output from the second matching model and the vehicle behavior feature. For each of the plural training data items, the first loss computation section is configured to extract a feature vi of a frame image at time instant k of an $i^{th}$ video of the training data by inputting a frame image at the time instant k in the $i^{th}$ video to the image feature extraction model, extract a feature $w_j^i$ of the $j^{th}$ sentence of a text description associated with the $i^{th}$ video of the training data by inputting the $j^{th}$ sentence in the text description to the text feature extraction model, calculate a similarity $s_{jk}^i$ between the frame image at the time instant k in the $i^{th}$ video and the $j^{th}$ sentence in the text description by inputting the first matching model with a combination of the feature $v_k^i$ of the frame image at the time instant k in the $i^{th}$ video of the training data combined with the feature $w_j^1$ of the $j^{th}$ sentence in the text description for the $i^{th}$ video, and also calculate a weighting coefficient $a_{jk}^i$ in accordance with the similarity $s_{jk}$ as a matching result, acquire a feature $f_j^i$ of the $j^{th}$ sentence for the $i^{th}$ video by inputting the first output model with a combination of the weighting coefficient $a_{jk}^i$ that is the matching result for the $i^{th}$ video of the training data combined with the feature $v_k^i$ of the frame image at the time instant k in the $i^{th}$ video, acquire a revamped video feature $F_j^i$ corresponding to a feature $f_j^i$ of the $i^{th}$ video of the training data and a revamped sentence feature $W_j^i$ corresponding to the feature $w_j^i$ of the $j^{th}$ sentence in the text description for the $i^{th}$ video by inputting the first mapping model with a combination of the video feature $f_j^i$ combined with the sentence feature $w_j^i$, and compute a first loss represented by a difference between the revamped video feature $F_j^i$ and the revamped sentence feature $W_j^i$. For each of the plural training data items, the second loss computation section is configured to extract a feature $c_j^i$ of the vehicle behavior at time instant 1 in $i^{th}$ vehicle behavior data associated with the $i^{th}$ video of the training data by inputting the vehicle behavior feature extraction model with a behavior at time instant 1 in the vehicle behavior data, calculate a similarity $u_{jl}^i$ between the vehicle behavior at time instant 1 in the vehicle behavior data associated with the $i^{th}$ video and the $j^{th}$ sentence in the text description by inputting the second matching model with a combination of the feature $c_l^i$ of the behavior at time instant 1 in the vehicle behavior data associated with the $i^{th}$ video of the training data combined with the feature $w_j^i$ of the $j^{th}$ sentence in the text description for the $i^{th}$ video, and calculate a weighting coefficient $b_{jl}^i$ in accordance with the similarity $u_{jl}^i$ as a matching result, acquire a feature $g_j^i$ of the vehicle behavior data by inputting the second output model with plural combinations of the weighting coefficient $b_{jl}^i$ that is the matching result for the vehicle behavior data associated with the $i^{th}$ video of the training data combined with the feature $c_l^i$ of the vehicle behavior at time instant 1 for the vehicle behavior data associated with the $i^{th}$ video, acquire a revamped feature $G_j^i$ of the vehicle behavior data corresponding to the feature $g_j^i$ of the $j^{th}$ sentence for the vehicle behavior data associated with the $i^{th}$ video of the training data and a revamped feature $W^\sim{}_j^i$ of the sentence corresponding to the feature $w_j^i$ of the $j^{th}$ sentence in the text description for the $i^{th}$ video by inputting the second mapping model with a combination of the sentence feature $g_j^i$ combined with the sentence feature $w_j^i$, and compute a second loss represented by a difference between the revamped vehicle behavior data feature $G_j^i$ and the revamped sentence feature $W^\sim{}_j^i$.

A retrieval system according to an eighth aspect is a retrieval system including a retrieval device and a training device, wherein the text feature extraction model employed in the retrieval device is a pre-trained text feature extraction model trained by the training device.

A recording medium according to a ninth aspect is a recording medium recorded with a retrieval program to cause a computer to execute processing. The processing includes: acquiring a search text; extracting a feature corresponding to the search text by inputting the acquired search text to a text feature extraction model configured to extract features from input sentences, the text feature extraction model being pre-trained so as to reduce a loss represented by a difference between a feature extracted from a sentence and a feature extracted from a correctly matched vehicle-view video, and also being pre-trained so as to reduce a loss represented by a difference between a feature extracted from the sentence and a feature extracted from correctly matched vehicle behavior data representing temporal vehicle behavior; computing a text distance for each of plural combinations stored in a database with each combination associating a text description including plural sentences, with a vehicle-view video, and with vehicle behavior data representing temporal vehicle behavior, the text distance being represented by a difference between a feature extracted from each sentence of the text description associated with the video and vehicle behavior data, and the feature corresponding to the search text; and outputting as a search result a prescribed number of pairs of video and vehicle behavior data pairs in sequence from the smallest text distance according to the computed text distances.

A recording medium according to a tenth aspect is a recording medium recorded with a training program to cause a computer to execute processing for each of plural training data items associating a text description including plural sentences, with a vehicle-view video, and with vehicle behavior data representing temporal vehicle behavior. The processing includes: extracting a feature of a sentence of training data by inputting the sentence to a text feature extraction model configured to extract features from input sentences; extracting a feature of a video corresponding to the same training data by inputting the video to a video feature extraction model configured to extract features from input video; computing a first loss represented by a difference between the sentence feature and the video feature; extracting a feature of a sentence of the training data item by inputting the sentence to the text feature extraction model; extracting a feature of vehicle behavior data corresponding to the same training data by inputting the vehicle behavior data to a vehicle behavior feature extraction model configured to extract features from input vehicle behavior data; computing a second loss represented by a difference between the sentence feature and the vehicle behavior data feature; computing an overall loss function unifying the first loss with the second loss; executing first training processing to train the text feature extraction model and the video feature extraction model so as to reduce the computed overall loss function; executing second training processing to train the text feature extraction model and the vehicle behavior feature extraction model so as to reduce the computed overall loss function; and obtaining a pre-trained sentence feature extraction model by causing the first training processing and the second training processing to be performed repeatedly until the computed overall loss function becomes smaller than a prescribed threshold.

As described above, the technology disclosed herein exhibits the advantageous effect of enabling the retrieval of video and vehicle behavior data pairs corresponding to a driving scene described by search text.

The disclosures of Japanese Patent Application No. 2019-138287, filed on Jul. 26, 2019 are incorporated herein by reference in their entirety.

All publications, patent applications, and technical standards mentioned in this specification are herein incorporated by reference to the same extent as if each individual publication, patent application, or technical standard was specifically and individually indicated to be incorporated by reference.

The invention claimed is:

1. A retrieval device, comprising:
a memory, and
a processor coupled to the memory, the processor being configured to:
acquire a search text,
extract a feature corresponding to the search text by inputting the search text to a text feature extraction model configured to extract features from input sentences, the text feature extraction model being pre-trained so as to reduce a loss represented by a difference between a feature extracted from a sentence and a feature extracted from a correctly matched vehicle-view video, and also being pre-trained so as to reduce a loss represented by a difference between a feature extracted from the sentence and a feature extracted from correctly matched vehicle behavior data representing temporal vehicle behavior,
compute a text distance for each of a plurality of combinations stored in the memory, each combination associating a text description, including a plurality of sentences, with a vehicle-view video and with vehicle behavior data representing temporal vehicle behavior, the text distance being represented by a difference between a feature extracted from each sentence of the text description associated with the video and the vehicle behavior data, and the feature corresponding to the search text, and
output, as a search result, a prescribed number of pairs of video and vehicle behavior data pairs in sequence from the smallest text distance, in accordance with all text distances.

2. The retrieval device of claim 1, wherein the processor is configured to:

extract a feature $Q_1$ of a first sentence $q_1$, which is a sentence in the search text that describes a video, by inputting the first sentence $q_1$ into the text feature extraction model;
extract a feature $Q_2$ of a second sentence $q_2$, which is a sentence in the search text that describes vehicle behavior data, by inputting the second sentence $q_2$ into the text feature extraction model;
compute the text distance according to a difference between the feature $Q_1$ of the first sentence $q_1$ and a feature $W_{j_l}^i$ of a $j_l^{th}$ sentence of a text description associated with an $i^{th}$ video for each of a plurality of training data items stored in the memory, and according to a difference between the feature $Q_2$ of the second sentence $q_2$ and a feature $W^\sim{}_{j_2}^i$ of a $j_2^{th}$ sentence of a text description associated with the $i^{th}$ video stored in the memory; and
output, as a search result, N pairs of video and vehicle behavior data pairs in sequence from the smallest text distance.

3. The retrieval device of claim 2, wherein for each $n^{th}$ ($1 \le n \le N$) pair included in the N pairs of video and vehicle behavior data pairs, the processor is configured to output, as the search result, a pair of:
frame images of a segment $[k_s^{(n)}, k_e^{(n)}]$ for which a weighting coefficient $a^i_{j_l(n)k}$ is larger than a threshold $\delta_1$, based on the weighting coefficient $a^i_{j_l(n)k}$ in accordance with a similarity $s^i_{jk}$ between a feature of a $j_1^{(n)th}$ sentence in the text description associated with the $i^{th}$ video, corresponding to the $n^{th}$ pair and a feature of a frame image for a time instant k in the $i^{th}$ video, and
a vehicle behavior of a segment $[l_s^{(n)}, l_e^{(n)}]$ for which a weighting coefficient $b^i_{j_2(n)1}$ is larger than a threshold $\delta_2$, based on the weighting coefficient $b^i_{j_2(n)1}$ in accordance with h a similarity $u^i_{j_2(n)l}$ between a feature of a $j_2^{(n)th}$ sentence in the text description associated with vehicle behavior data, corresponding to the $i^{th}$ video corresponding to the $n^{th}$ pair and a feature of a vehicle behavior at a time instant l in the vehicle behavior data corresponding to the $i^{th}$ video.

4. The retrieval device of claim 1, wherein the processor is configured to output, as the search result, a number of n* pairs of the N pairs of video and vehicle behavior data pairs, wherein the number n* has been preset by a user.

5. A training device, comprising:
a memory, and
a processor coupled to the memory, the processor being configured, for each of a plurality of training data items associating a text description, including a plurality of sentences, with a vehicle-view video and with vehicle behavior data representing temporal vehicle behavior, to:
extract a feature of a sentence of training data by inputting the sentence to a text feature extraction model configured to extract features from input sentences, extract a feature of a video corresponding to the same training data by inputting the video to a video feature extraction model configured to extract features from input video, and compute a first loss represented by a difference between the sentence feature and the video feature;
extract a feature of a sentence of the training data by inputting the sentence to the text feature extraction model, extract a feature of vehicle behavior data corresponding to the same training data by inputting the vehicle behavior data to a vehicle behavior feature extraction model configured to extract features from input vehicle behavior data, and compute a second loss represented by a difference between the sentence feature and the vehicle behavior data feature;

compute an overall loss function unifying the first loss with the second loss;

train the text feature extraction model and the video feature extraction model so as to reduce the overall loss function;

train the text feature extraction model and the vehicle behavior feature extraction model so as to reduce the overall loss function; and obtain a pre-trained sentence feature extraction model by causing the training processing to be performed repeatedly, until the overall loss function computed by the unifying section becomes smaller than a prescribed threshold.

6. The training device of claim 5, wherein the processor is configured to:

acquire a revamped sentence feature and a revamped video feature mapped into a same joint space, by inputting the sentence feature extracted by the text feature extraction model and the video feature extracted by the video feature extraction model to a first mapping model configured to map a plurality of different features into the same joint space, and compute a first loss represented by a difference between the revamped sentence feature and the revamped video feature; and acquire a revamped sentence feature and a revamped vehicle behavior data feature mapped into a same joint space, by inputting the sentence feature extracted by the text feature extraction model and the vehicle behavior data feature extracted by the vehicle behavior feature extraction model to a second mapping model configured to map a plurality of different features into the same joint space, and compute a second loss represented by a difference between the revamped sentence feature and the revamped vehicle behavior data feature.

7. The training device of claim 6, wherein:

the video feature extraction model includes an image feature extraction model configured to extract features from images, a first matching model configured to match sentence features against image features, and a first output model configured to output video features based on matching results output from the first matching model and the image feature;

the vehicle behavior feature extraction model includes a temporal feature extraction model configured to extract features from vehicle behavior at each time instant of the vehicle behavior data, a second matching model configured to match sentence features against vehicle behavior features, and a second output model configured to output vehicle behavior data features based on matching results output from the second matching model and the vehicle behavior feature;

for each of the plurality of training data items, the processor is configured to:

extract a feature $v_k^i$ of a frame image at time instant k of an $i^{th}$ video of the training data, by inputting a frame image at the time instant k in the $i^{th}$ video to the image feature extraction model, extract a feature $w_j^i$ of a $j^{th}$ sentence of a text description associated with the $i^{th}$ video of the training data, by inputting the $j^{th}$ sentence in the text description to the text feature extraction model, calculate a similarity $s_{jk}^i$ between the frame image at the time instant k in the $i^{th}$ video and the $j^{th}$ sentence in the text description, by inputting the first matching model with a combination of the feature $v_k^i$ of the frame image at the time instant k in the $i^{th}$ video of the training data, combined with the feature $w_j^i$ of the $j^{th}$ sentence in the text description for the $i^{th}$ video, and also calculate a weighting coefficient $a_{jk}^i$ in accordance with the similarity $s_{jk}^i$ as a matching result;

acquire a feature $f_j^i$ of the $j^{th}$ sentence for the $i^{th}$ video, by inputting the first output model with a combination of the weighting coefficient $a_{jk}^i$ that is the matching result for the $i^{th}$ video of the training data, combined with the feature $v_k^i$ of the frame image at the time instant k in the $i^{th}$ video;

acquire a revamped video feature $F_j^i$ corresponding to a feature $f_j^i$ of the $i^{th}$ video of the training data and a revamped sentence feature $W_j^i$ corresponding to the feature $w_j^i$ of the $j^{th}$ sentence in the text description for the $i^{th}$ video, by inputting the first mapping model with a combination of the video feature $f_j^i$ combined with the sentence feature $w_j^i$, and compute a first loss represented by a difference between the revamped video feature $F_j^i$ and the revamped sentence feature $W_j^i$; and for each of the plural training data items, the processor is configured to:

extract a feature $u_{jl}^i$ of the vehicle behavior at time instant l in $i^{th}$ vehicle behavior data associated with the $i^{th}$ video of the training data, by inputting the vehicle behavior feature extraction model with a behavior at time instant l in the vehicle behavior data, calculate a similarity $u_{jl}^i$ between the vehicle behavior at time instant l in the vehicle behavior data associated with the $i^{th}$ video and the $j^{th}$ sentence in the text description, by inputting the second matching model with a combination of the feature $c_l^i$ of the behavior at time instant l in the vehicle behavior data associated with the $i^{th}$ video of the training data, combined with the feature $w_j^i$ of the $j^{th}$ sentence in the text description for the $i^{th}$ video, and calculate a weighting coefficient $b_{jl}^i$ in accordance with the similarity $u_{jl}^i$ as a matching result, acquire a feature $g_l^i$ of the vehicle behavior data, by inputting the second output model with a plurality of combinations of the weighting coefficient $b_{jl}^i$ that is the matching result for the vehicle behavior data associated with the $i^{th}$ video of the training data, combined with the feature $c_l^i$ of the vehicle behavior at time instant l for the vehicle behavior data associated with the $i^{th}$ video, acquire a revamped feature $G_j^i$ of the vehicle behavior data corresponding to the feature $g_j^i$ of the $j^{th}$ sentence for the vehicle behavior data associated with the $i^{th}$ video of the training data and a revamped feature $W^\sim_j^i$ of the sentence corresponding to the feature $w_j^i$ of the $j^{th}$ sentence in the text description for the $i^{th}$ video, by inputting the second mapping model with a combination of the sentence feature $g_j^i$ combined with the sentence feature $w_j^i$, and compute a second loss represented by a difference between the revamped vehicle behavior data feature $G_j^i$ and the revamped sentence feature $W^\sim_j^i$.

8. A retrieval system, comprising:

a retrieval device comprising:

a memory, and a processor coupled to the memory, the processor being configured to:

acquire a search text, extract a feature corresponding to the search text by inputting the search text to a text feature extraction model configured to extract features from input sentences, the text feature extraction model being pre-trained so as to reduce a loss represented by a difference between a feature extracted from a sentence and a feature extracted from a correctly matched vehicle-view video, and also being pre-trained so as to reduce a loss represented by a difference between a feature extracted from the sentence and a feature extracted from correctly matched vehicle behavior data representing temporal vehicle behavior, compute a text distance for each of a plurality of combinations stored in the memory, each combination associating a text description, including a plurality of sentences, with a vehicle-view video and with vehicle behavior data representing temporal vehicle behavior, the text distance being represented by a difference between a feature extracted from each sentence of the text description associated with the video and the vehicle behavior data, and the feature corresponding to the search text, and output, as a search result, a prescribed number of pairs of video and vehicle behavior data pairs in sequence from the smallest text distance, in accordance with all text distances; and a training device comprising:

a memory, and a processor coupled to the memory, the processor being configured, for each of a plurality of training data items associating a text description, including a plurality of sentences, with a vehicle-view video and with vehicle behavior data representing temporal vehicle behavior, to:

extract a feature of a sentence of training data by inputting the sentence to a text feature extraction model configured to extract features from input sentences, extract a feature of a video corresponding to the same training data by inputting the video to a video feature extraction model configured to extract features from input video, and compute a first loss represented by a difference between the sentence feature and the video feature;

extract a feature of a sentence of the training data by inputting the sentence to the text feature extraction model, extract a feature of vehicle behavior data corresponding to the same training data by inputting the vehicle behavior data to a vehicle behavior feature extraction model configured to extract features from input vehicle behavior data, and compute a second loss represented by a difference between the sentence feature and the vehicle behavior data feature;

compute an overall loss function unifying the first loss with the second loss;

train the text feature extraction model and the video feature extraction model so as to reduce the overall loss function;

train the text feature extraction model and the vehicle behavior feature extraction model so as to reduce the overall loss function; and obtain a pre-trained sentence feature extraction model by causing the training processing to be performed repeatedly, until the overall loss function computed by the unifying section becomes smaller than a prescribed threshold, wherein the text feature extraction model employed in the retrieval device is a pre-trained text feature extraction model trained by the training device.

9. A non-transitory recording medium recorded with a retrieval program to cause a computer to execute processing, the processing comprising:

acquiring a search text;

extracting a feature corresponding to the search text by inputting the acquired search text to a text feature extraction model configured to extract features from input sentences, the text feature extraction model being pre-trained so as to reduce a loss represented by a difference between a feature extracted from a sentence and a feature extracted from a correctly matched vehicle-view video, and also being pre-trained so as to reduce a loss represented by a difference between a feature extracted from the sentence and a feature extracted from correctly matched vehicle behavior data representing temporal vehicle behavior;

computing a text distance for each of a plurality of combinations stored in a database with each combination associating a text description, including a plurality of sentences, with a vehicle-view video and with vehicle behavior data representing temporal vehicle behavior, the text distance being represented by a difference between a feature extracted from each sentence of the text description associated with the video and vehicle behavior data, and the feature corresponding to the search text; and outputting, as a search result, a prescribed number of pairs of video and vehicle behavior data pairs in sequence from the smallest text distance, in accordance with the computed text distances.

* * * * *